United States Patent
Katoot

Patent Number: 6,091,872
Date of Patent: Jul. 18, 2000

[54] OPTICAL FIBER IMAGING SYSTEM

[76] Inventor: Mohammad W. Katoot, 1080 Laurian Park Dr., Roswell, Ga. 30075

[21] Appl. No.: 08/958,944

[22] Filed: Oct. 28, 1997

Related U.S. Application Data

[60] Provisional application No. 60/029,386, Oct. 29, 1996.

[51] Int. Cl.[7] .................................................. G02B 6/06
[52] U.S. Cl. .......................... 385/116; 385/115; 385/120
[58] Field of Search .................................. 385/116, 115, 385/119, 117, 118, 120

[56] References Cited

U.S. PATENT DOCUMENTS

| | | |
|---|---|---|
| Re. 33,755 | 11/1991 | Downey et al. . |
| 3,248,180 | 4/1966 | Kilpatrick . |
| 3,443,909 | 5/1969 | Goossens . |
| 3,484,213 | 12/1969 | Dew et al. . |
| 3,528,782 | 9/1970 | Riggert et al. . |
| 3,544,522 | 12/1970 | Hahn . |
| 3,740,115 | 6/1973 | Cole ........................................ 385/117 |
| 4,021,600 | 5/1977 | Anolick et al. ......................... 528/484 |
| 4,210,567 | 7/1980 | Kosters . |
| 4,505,543 | 3/1985 | Ueba et al. . |
| 4,571,313 | 2/1986 | Allemand et al. ....................... 264/1.5 |
| 4,687,294 | 8/1987 | Angeles ............................... 385/100 X |
| 4,734,263 | 3/1988 | Gerking et al. ......................... 422/135 |
| 4,842,369 | 6/1989 | Teshima et al. . |
| 4,889,408 | 12/1989 | Teshima et al. ...................... 350/96.34 |
| 4,891,075 | 1/1990 | Dakubu ................................... 136/257 |
| 4,893,897 | 1/1990 | Parker et al. . |
| 4,919,513 | 4/1990 | Nakakuki et al. ................... 350/96.33 |
| 4,989,947 | 2/1991 | Sasaki et al. ......................... 350/96.34 |
| 5,145,255 | 9/1992 | Shimada et al. ........................ 366/329 |
| 5,217,518 | 6/1993 | Petisce .................................... 65/10.1 |
| 5,222,180 | 6/1993 | Kuder et al. ............................ 385/115 |
| 5,225,166 | 7/1993 | Zarian et al. ........................... 422/109 |
| 5,245,057 | 9/1993 | Shirtum .................................... 549/517 |
| 5,286,457 | 2/1994 | Woodson et al. ....................... 422/135 |
| 5,308,986 | 5/1994 | Walker ............................... 250/370.11 |
| 5,312,471 | 5/1994 | Jung ......................................... 65/18.2 |
| 5,390,274 | 2/1995 | Toyoda et al. .......................... 385/124 |
| 5,443,775 | 8/1995 | Brannon .................................. 264/143 |
| 5,466,535 | 11/1995 | Higgins et al. ......................... 428/483 |
| 5,470,539 | 11/1995 | Imamura et al. ....................... 422/136 |
| 5,476,638 | 12/1995 | Sulzbach et al. ....................... 422/133 |
| 5,519,226 | 5/1996 | Copeland et al. .................. 250/390.11 |
| 5,599,507 | 2/1997 | Shaw et al. ............................. 422/135 |
| 5,607,648 | 3/1997 | Carter et al. ............................ 422/137 |
| 5,747,610 | 5/1998 | Katoot ..................................... 526/73 |

FOREIGN PATENT DOCUMENTS

| | | |
|---|---|---|
| 2 18007 | 1/1990 | Japan . |
| 588-685 | 9/1980 | U.S.S.R. . |

OTHER PUBLICATIONS

Sandler, et al., "Polymer Synthesis," Second Edition, vol. 1, pp. 5–12, Academic Press (1992).

Ishigure, T., "Graded Index Polymer Optical Fiber for Speed Data Communications," *Applied Optics* vol. 33, No. 19, pp. 4261–4266 (1994).

"Gradient Index Microlenses," *Opto Sigma Optics Catalog*, pp. 78–82, (1995/1996).

*Primary Examiner*—Phan T. H. Palmer
*Attorney, Agent, or Firm*—Jones & Askew, LLP

[57] ABSTRACT

The present invention relates to polymeric fiber optic imaging bundles and their use for high resolution viewing of objects, including three-dimensional real time viewing of objects. The present invention also relates to an automated system for using these imaging bundles to view several objects with high resolution and to process this information rapidly to obtain and analyze characteristics of the exterior and interior surfaces of objects.

21 Claims, 3 Drawing Sheets fig. 1 fig. 2 fig. 3 fig. 4

OPTICAL FIBER IMAGING SYSTEM

PRIOR RELATED APPLICATIONS

The present application claims priority to U.S. provisional patent application Ser. No. 60/029,386, filed Oct. 29, 1996, incorporated herein by reference in its entirety.

TECHNICAL FIELD

The present invention relates to imaging bundles, comprised of glass or polymeric optical fibers for high resolution, three-dimensional viewing of objects. These imaging bundles may optionally comprise illumination fibers. The present invention also relates to an automated system for using imaging bundles for simultaneous viewing of several objects and to process and store this information in a computer.

BACKGROUND OF THE INVENTION

Viewing objects with high resolution is essential to numerous industries, scientific research, and the clinical practice of medicine. The ability to obtain a magnified image with three-dimensional quality that has excellent resolution and minimal distortion has been sought by many individuals. For example, obtaining a clear image of the interior of certain objects, such as pistons and cylinders within engines such as diesel engines, is difficult, often necessitating the laborious dismantling of many components of the engine. Mechanics also require remote access to inspect components of jet engines. Plumbers face similar difficulties trying to determine the cause or location of a blockage in a pipe, for example a sewer pipe leading from a house to a municipal sewer main. Residents face similar problems in determining the cause of blocked drains and toilets. Robots for use in undersea, high altitude, and space exploration, and in recovery operations also require excellent optical capabilities and an accompanying illumination source.

Analysis of objects to provide quality control assessment of manufacturing accuracy and precision is an expensive and time consuming procedure. It is difficult to rapidly and accurately evaluate the surface qualities of small objects, especially those with interior surfaces. For example, the manufacture of acceptable stents for use as medical implants in vessels and ducts requires a detailed inspection to ensure that burrs, notches, scratches, sharp edges, and jagged edges are not present. Such defects could damage biological tissue such as endothelial cells and the adjacent layers of the vessel wall causing adverse biological events including rupture of the vessel wall and bleeding.

Human visual examination of these stents under magnification is time consuming and expensive. This human inspection step greatly limits manufacturing output and increases the net cost of each stent. What is needed is an improved method for high resolution examination of objects such as stents, that does not rely on human visual examination of each stent. This method should be capable of examining the exterior and interior surfaces of objects with high resolution. What is needed is a system that permits rapid examination of objects and also facilitates automated storage of the collected data for subsequent analysis.

Analysis of large and small objects at high resolution is time consuming and prone to human error. The surfaces of some objects must be examined with microscopes, including scanning electron microscopes. Preparation of samples for scanning electron microscopy is expensive and time consuming, and requires the services of a dedicated technician who may coat the surfaces of objects with gold or another metal. Scanning electron microscopy is also limited by the number of samples that may be processed and then examined in one sitting at the microscope. Human visual analysis of integrated circuits and circuit boards is another costly and time intensive process. Accordingly, what is needed is a system that permits rapid, automated, high resolution viewing of objects, and optionally storage of the data to facilitate quality control assessment of the objects and identification of acceptable objects and also defective objects. What is also needed is a system that permits automated removal of defective objects.

In endoscopic procedures, one limiting factor is the inability of the examiner to evaluate relative sizes, volumes and distances in the body cavities and in various organs. This problem forces the repetitive insertion and withdrawal of the devices, often without success. What is needed is a high resolution, three-dimensional image of the interior of the body which instantaneously displays relative sizes, depths, and appearances of the organs and tissues examined. Examination of the interior of vessels, ducts, the digestive, reproductive and urinary tracts, the respiratory tree, the larynx, cerebral ventricles, sinuses, joints, synovial joints, bursae, organs, and the body cavities, is limited by the size and sometimes by the flexibility of the fiber optic bundle and attached light source. What is needed is a high resolution, flexible, small diameter imaging bundle that permits entry and examination of small caliber vessels, ducts, and spaces. Data from these examinations should be capable of storage in a computer for subsequent manipulation, evaluation and display.

What is also needed is a system that can detect the heat of an object. For example, inflammation may be present in an organ or tissue by viewing the tissue with infrared radiation while being invisible when viewing the tissue with visible radiation. In another example, circuits may function poorly if excessive heat is generated from individual components such as resistors. What is needed is the capability for three-dimensional, high resolution viewing of these objects with optical fibers that transmit infrared radiation.

What is also needed is an imaging bundle that permits the delivery of ultraviolet radiation as excitation wavelengths and the viewing of emission radiation in the ultraviolet and visible range. For example, what is needed is a fiber bundle that can be used in endoscopic procedures which enables the delivery of excitation wavelengths in the ultraviolet range to excite fluorophores which then emit radiation in the ultraviolet and visible range. Such a system would facilitate the identification and localization of fluorochrome-labeled substances within the body.

SUMMARY OF THE INVENTION

The present invention addresses these problems and needs by providing an optical fiber bundle for viewing surfaces of objects with high resolution and accuracy. The optical fiber bundle may be made from glass or polymer, preferably polymer. The optical fiber bundle has a first end pointed at the object to be viewed and a second end for visualization of the optical information transmitted through the optical fiber bundle. These polymeric optical fiber bundles may be manufactured to provide different fiber sizes, different limits of resolution, and different transmission properties. Although a variety of optical fibers may be used in the practice of the present invention, graded index polymeric optical fibers are preferred for superior resolution of images. Graded index polymeric optical fibers provide superior resolution of images by eliminating what is commonly known as "chicken wire effect" in the resulting image. Resolutions ranging from 12 μm (infrared radiation) to a few nm (X-ray radiation) may be obtained with these polymeric optical fiber bundles. The resolution of these polymeric optical fiber bundles is approximately equivalent to the wavelength of the illuminating light and depends on the chemical composition of the fibers within the bundles. These optical fiber bundles are used in a variety of configurations or systems that allow different viewing capabilities. For example, tapered bundles are used to project a three-dimensional image, while non-tapered bundles can be used for two-dimensional projection. The length of the tapered bundle, the diameters of the two ends of the bundle and the size of the single optical fibers contained within the bundle produce significant variation in resolution and depth of the three-dimensional image. While not wanting to be bound by the following statement, it is believed that the three dimensional images obtainable with the tapered bundles are due to the differences in path lengths between individual fibers within the tapered bundle of fibers and the inherent differences in the indices of refraction between these fibers.

In one embodiment, lenses, optionally including graded index lenses, are attached to the first end of the polymeric optical fiber bundle to focus an image on the first end of the polymeric optical fiber bundle.

In another embodiment, lenses, optionally including graded index lenses, are attached to the second end of the polymeric optical fiber bundle to focus the visual information transmitted through the optical fiber bundle on an back plane of the lens which is mounted against the second end of the polymeric optical fiber bundle.

In yet another embodiment, lenses, optionally including graded index lenses, are attached to both ends of the polymeric optical fiber bundle.

These polymeric optical fiber bundles may be attached to an illumination fiber which is linked to a source of illumination and illuminates the object. Various wavelengths such as visible light, ultraviolet, infrared, laser, gamma and X-ray radiation may be passed through these illumination fibers.

Imaging bundles are optical fiber bundles optionally combined with illumination fibers and housed within a sheath. These imaging bundles may be flexible or rigid, and may be designed to have diameters as small as 200 μm. Imaging bundles may be packaged and used for a wide variety of applications for viewing the surfaces of objects.

These polymeric optical fiber bundles may also be associated with or made to include materials that shift the wavelength of radiation. These materials may be incorporated into the optical fibers directly or may be inserted on the end of the optical fiber bundle as a disk located between the lens and either end of the optical fiber bundle. In this manner the wavelength of incoming light may be shifted from ultraviolet, infrared, gamma or X-ray radiation to visible light. The wavelengths may also be shifted from X-ray radiation to ultraviolet, from ultraviolet to infrared, or from visible to ultraviolet or infrared.

The imaging bundles of the present invention may be employed to examine the surfaces of a variety of objects, including objects that are routinely examined with scanning electron microscopy or other forms of microscopy. In addition, these imaging bundles may be linked to charge coupled devices (CCDs), processors and computers so that two- and three-dimensional information about an object may be manipulated and stored for subsequent viewing. A CCD containing one or more lenses is considered to act as a camera in the context of the present invention.

In one embodiment of the present invention, the object to be viewed may be moved in two or three dimensions to permit viewing of all surfaces of the object through the imaging bundle. In another embodiment, the imaging bundle or bundles may be moved relative to the object, including insertion into the lumen of the object, to permit complete viewing of all surfaces. In yet another embodiment, several imaging bundles may be arranged so that several objects may be viewed simultaneously. This system may also be linked to CCDs, processors and computers with imaging boards, and optionally to automated systems for moving the objects relative to the imaging bundles, or moving the imaging bundles relative to the objects. In this manner, a multitude of objects may be automatically moved into specific positions with translation stages, examined and then the data from the examinations evaluated to determine if the object meets the manufacturing acceptance criteria.

The present invention also provides imaging bundles comprised of a flexible, high resolution, and small polymeric optical fiber bundles that may be coupled to an illumination or radiation source for endoscopic examination of the interior of vessels, ducts, the gastrointestinal, reproductive and urinary systems, sinuses, organs, the cerebroventricular system, the cardiovascular system, and body cavities, including but not limited to the pleural, thoracic, abdominopelvic, peritoneal and cranial cavities. Data from these examinations can be storage in a computer for subsequent evaluation, manipulation, viewing and diagnosis.

The present invention addresses these and other problems in the prior art by providing optical fiber bundles that permit the viewing of objects with high resolution.

Accordingly, it is an object of the present invention to provide optical fiber bundles that permit the viewing of objects with high resolution.

Accordingly, it is an object of the present invention to provide optical fiber bundles that permit the three-dimensional viewing of objects.

It is further an object of the present invention to provide optical fiber bundles that permit the viewing of the exterior surfaces of objects with high resolution.

It is further an object of the present invention to provide optical fiber bundles that permit the viewing of the interior and exterior surfaces of objects with high resolution.

It is yet another specific object of the present invention to provide optical fiber bundles that permit the viewing of the interior and exterior surfaces of stents and catheters with high resolution.

It is another specific object of the present invention to provide a system that permits the viewing of the interior and exterior surfaces of renal, coronary, cerebral, and peripheral stents and catheters with high resolution.

It is further an object of the present invention to provide a system that permits the simultaneous viewing of the interior and exterior surfaces of multiple objects with high resolution.

An advantage of this system is that it provides a three dimensional image.

It is another object of the present invention to provide a system that permits the simultaneous viewing of the interior and exterior surfaces of multiple objects with high resolution and the storage of the data from such images for subsequent manipulation, analysis and viewing.

It is further an object of the present invention to provide an imaging bundle of optical fibers in an optical bundle that optionally has an illumination fiber or several illumination fibers.

Still another an object of the present invention is to provide an imaging bundle wherein the illumination fiber is linked to an ultraviolet source.

Another an object of the present invention is to provide an imaging bundle wherein the illumination fiber is linked to an infrared source.

It is further an object of the present invention is to provide an imaging bundle wherein the illumination fiber is linked to a gamma ray source.

It is further an object of the present invention is to provide an imaging bundle wherein the illumination fiber is linked to a X-ray source.

It is further an object of the present invention is to provide an imaging bundle wherein the illumination fiber is linked to a laser source.

Another an object of the present invention is to provide a optical fiber bundle that magnifies the object that is viewed.

Yet another object of the present invention is to provide polymeric optical fiber bundles that have different lenses attached to an end of the optical fiber bundle.

It is yet another object of the present invention to provide a polymeric optical fiber bundle that has a lens attached to an end of each of the polymeric optical fibers.

It is another object of the present invention to provide an optical fiber bundle that has filters attached to an end of the optical fiber bundle.

Yet another object of the present invention is to provide polymeric optical fiber bundles that have wavelength shifters incorporated into the fibers within the polymeric optical fiber bundle or incorporated into a disk for insertion between the lens and the end of the polymeric optical fiber bundle.

It is further a specific object of the present invention to provide an imaging bundle, comprising a polymeric optical fiber bundle associated with an illumination fiber, that may be used for viewing the interior surfaces of vessels, ducts, the digestive, cardiovascular, lymphatic, reproductive and urinary systems, the respiratory tree, the larynx, cerebral ventricles, sinuses, joints, synovial joints, bursae, organs, and the body cavities.

These and other objects, features and advantages of the present invention will become apparent after a review of the following detailed description of the disclosed embodiments.

BRIEF DESCRIPTION OF THE FIGURES

FIG. 1 includes a cross-sectional view of an imaging bundle 15. The imaging bundle 15 has a diameter less than 1.2 mm and contains an illumination fiber 20 and an imaging optical fiber 25, both housed within a stainless steel sheath 30.

DETAILED DESCRIPTION OF THE INVENTION

The following patent applications are incorporated herein by reference in their entirety: U.S. patent application Ser. No. 08/594,711 now U.S. Pat. No. 5,861,129 filed Jan. 31, 1996; U.S. patent application Ser. No. 08/667,218 now U.S. Pat. No. 5,747,610, filed Jun. 21, 1996; PCT application PCT/US96/14786 filed on Sep. 13, 1996; U.S. Provisional Patent Application Ser. No. 60/029,386, filed Oct. 29, 1996; U.S. Provisional Patent Application Ser. No. 60/042,876, filed Apr. 1, 1997; U.S. Provisional Patent Application Ser. No. 60/054,088; filed Jul. 29, 1997; and PCT application PCT/US97/16442 filed on Sep. 15, 1997.

By the term "optical fiber" is meant any glass or polymeric optical fiber that may be used for transmitting radiation including, but not limited to, wavelengths of visible, ultraviolet, infrared, laser, gamma and X-ray radiation. Polymeric optical fibers are preferred optical fibers used in the practice of the present invention. Graded index polymer optical fibers are the most preferred optical fibers used in the practice of the present invention. It is to be understood that the optical fibers may be designed to include the ability to shift the wavelengths of radiation transmitted through the fiber as described in U.S. patent application Ser. No. 08/667,219 U.S. Pat. No. 5,747,610, U.S. Provisional Patent Application Ser. No. 60/042,876, U.S. Provisional Patent Application Ser. No. 60/054,088, and PCT application PCT/US97/16442.

By the term "optical fiber bundle" 25 is meant any combination of glass or polymeric fibers that may be used for transmitting radiation including, but not limited to wavelengths of visible, ultraviolet, infrared, laser, gamma and X-ray radiation. Such a combination may be achieved through gathering optical fibers into a bundle and optionally fusing the optical fibers into a fused bundle.

By the term "illumination fiber" 20 is meant any glass or polymeric step index fiber that transmits energy from an illumination source near the proximal tip of the illumination fiber to the distal tip of the illumination fiber. Illumination sources may provide energies such as visible, ultraviolet, infrared, laser, gamma and X-ray radiation for transmission through illumination fibers.

By the term "imaging bundle" 15 is meant a combination of one or more optical fibers designed to transmit light or images, such a combination attained by fusing, or in other ways bundling optical imaging fibers 35 together. Imaging bundles 15 include a combination of fused or bundled optical fibers 25, optionally combined with one or more illumination fibers 20, all optionally housed within a sheath 30. Imaging bundles 15 may be designed for specific functions or combinations of functions. For example, imaging bundles 15 may be specialized for transmission of specific radiation wavelengths through illumination fibers 20 or combinations of different illumination fibers 20. In one embodiment, an imaging bundle 15 may contain an illumination fiber 20 or several illumination fibers 20 specific for transmitting each of the following types of radiation: infrared, ultraviolet, gamma, X-ray, laser, and visible radiation.

It is within the scope of the present invention to optionally combine illumination fibers 20 specific for different types of radiation. It is also within the scope of the present invention to design optical fibers for optimal transmission of specific types of radiation provided through the illumination fibers 20. In one embodiment of the present invention, a single type of optical fiber optimized for transmission of a specific type of radiation may be used to make an optical fiber bundle 25 which may be housed in an imaging bundle 15. In another embodiment of the present invention, several types of optical fibers, each type optimized for transmission of a specific type of radiation, may be combined to make an optical fiber bundle 25 which may be housed in an imaging bundle 15 for use in visualizing several different wavelengths provided by illumination fibers.

In one embodiment of the present invention, an imaging bundle 15 in an endoscope contains illumination fibers 20 for transmission of visible radiation, other illumination fibers 20 for transmission of ultraviolet radiation, an optical fiber bundle 25 containing optical fibers for transmission of visible radiation and other optical fibers for transmission of ultraviolet radiation. Such an embodiment would permit, for example, the on-line, three-dimensional image of the interior surface of the duodenum at the site of an ulcer with visible light and also the fluorescein emission spectra following ultraviolet excitation of fluorescein-labeled molecules administered intravenously and leaking through the ulcer. Specialized optics may be provided for specific optical fibers dedicated to certain radiation wavelengths.

The present invention provides optical fiber bundles 25 that may be optionally combined with an illumination fiber 20 in an imaging bundle 15 for viewing objects. The present invention also provides a variety of embodiments of imaging bundles 15 for different applications. These bundles may be used in hand held devices, in automated systems 10 for simultaneous examination of numerous objects such as in quality control systems, in automated systems linked to CCDs 45, processors 40 and computers 35 for collection, storage, manipulation and conversion of optical data, in endoscopes and other devices including but not limited to arthroscopes, and in laparoscopes used for viewing interior spaces of the body and in performing surgical procedures, in microscopes, in magnifiers, and in monocular and binocular systems for surgeons. The present invention also provides a polymeric, tapered, microfiber optical bundle 25 in a specially configured system to permit three-dimensional viewing of objects.

In the simplest embodiment of the present invention, a polymeric optical fiber bundle is used to view objects. In this embodiment, no lenses are required and illumination of the object to be viewed may be provided from external sources. A tapered polymeric optical fiber bundle provides magnification of the object viewed. These polymeric optical fiber bundles may be constructed in various shapes and may even be twisted or curved and still retain their ability to transmit optical information. Graded index optical fibers are preferred fibers for use in the polymeric optical fiber bundle. Illumination of the object to be viewed may be provided through external sources or optionally through an illumination fiber attached to the polymeric optical fiber bundle. This embodiment of the present invention optionally includes the capability to shift the wavelength of the light or radiation from the surface of the object. This capability may be added by incorporating wavelength shifting additives into the polymeric optical fiber during its manufacture. Alternatively a wavelength shifting disk may be added to the end or ends of the optical fiber bundle.

In another embodiment of the present invention, a polymeric optical fiber bundle may have one or several lenses attached either to the first end pointed at the object to be viewed, to the second end used for receiving the optical information transmitted through the optical fiber bundle, or to both ends. Graded index lenses are preferred lenses although other lenses may be used. Graded index optical fibers are preferred fibers for use in the polymeric optical fiber bundle. Tapered optical fiber bundles may be used in conjunction with lenses to provide high resolution magnified images of the object. Illumination of the object to be viewed may be provided through external sources or optionally through an illumination fiber attached to the polymeric optical fiber bundle. This embodiment of the present invention optionally includes the capability to shift the wavelength of the light or radiation from the surface of the object. This capability may be added by incorporating wavelength shifting additives into the polymeric optical fiber during its manufacture. Alternatively a wavelength shifting disk may be added to the end or ends of the optical fiber bundle.

The present invention also provides an imaging bundle 15 comprising polymeric optical fiber bundles 25 that may be optionally combined with an illumination fiber 20 for transmitting visible or infrared radiation for viewing objects, and another illumination fiber 20 for destroying or modifying objects. In one embodiment, an endoscope equipped with an imaging bundle 15 employs laser energy transmitted through illumination fibers 20 to destroy a cancerous growth or a polyp visualized through optical fibers that transmit visible light provided to the object through a visible light illumination fiber 20, or visualized through optical fibers that transmit infrared radiation provided to the object through an infrared radiation illumination fiber 20.

In another embodiment, the present invention is used to examine the vagina, cervix, uterus, uterine tubes, and ovary. In yet another embodiment, the present invention is used to examine the urethra, bladder, ureters, renal pelvis, prostate, vas deferens, ejaculatory duct, and seminal vesicles. In yet another embodiment, the present invention is used to examine the anus, rectum, sigmoid colon, large intestine and small intestine, stomach, esophagus, oropharynx and oral cavity. In still another embodiment, the present invention is used to examine the air passages including the nasal cavity, sinuses, nasopharynx, trachea, larynx, bronchial tree, and alveolar sacs. In another embodiment the present invention is used to examine the cardiovascular system including, but not limited to, the cerebral vessels, the coronary vessels, the hepatic portal system, and all the other vessels in the body. The present invention is also used to examine ducts such as ducts of the hepato-biliary system and also the pancreatic and other exocrine ducts.

In another embodiment of the present invention, an endoscopic imaging bundle 15 comprising an optical fiber bundle 25 attached to an illumination fiber 20 for visible light, and to an illumination fiber for ultraviolet transmission, is used to visualize a suspicious area of bacterial infection on the lining of the intestine using radiation in the visible range. Then, the ultraviolet source is utilized to determine if, for example, previously administered fluorochrome-linked molecules are concentrated in the bacteria in this suspicious area. In another embodiment, an optical fiber bundle 25 attached to an illumination fiber 20 linked to an infrared source is used to visualize areas of increased heat production that might not be detected with solely an examination based on light in the visible range, such as in a mildly inflamed tissue. In yet another embodiment, an optical fiber bundle 25 may be specialized to detect infrared radiation emanating from areas of increased heat production, such as an area of inflammation, without the need for using an illumination fiber. It is to be understood that these are specific examples and that the present invention could be used in a wide variety of configurations for imaging many different organs, tissues, cells, ducts, and the interior surfaces of vessels, ducts, organs, the digestive, reproductive and urinary systems, the respiratory system, the larynx, cerebral ventricles, the cardiovascular system including coronary ventricles and atria, sinuses, joints, synovial joints, bursae, and the body cavities.

Many types of fusing are practiced in the present invention to combine individual optical fibers into a optical fiber bundle. Resin fusing refers to the use of commercial or plant resin pellets to produce a preform. Core-to-clad fusing refers to the fusing of the core material of the preform to the outer cladding in order to eliminate the air gap between the core and cladding and to prepare for the drawing of step index fibers. Fiber fusing indicates the fusing of multiple step-index or gradient-index fibers into a solid boule of multiple fibers for drawing to produce micro fibers. Micro fusing refers to the fusing of the multiple fiber boule to produce micro fiber plates which are then redrawn to produce the micro fibers.

Figure 3:
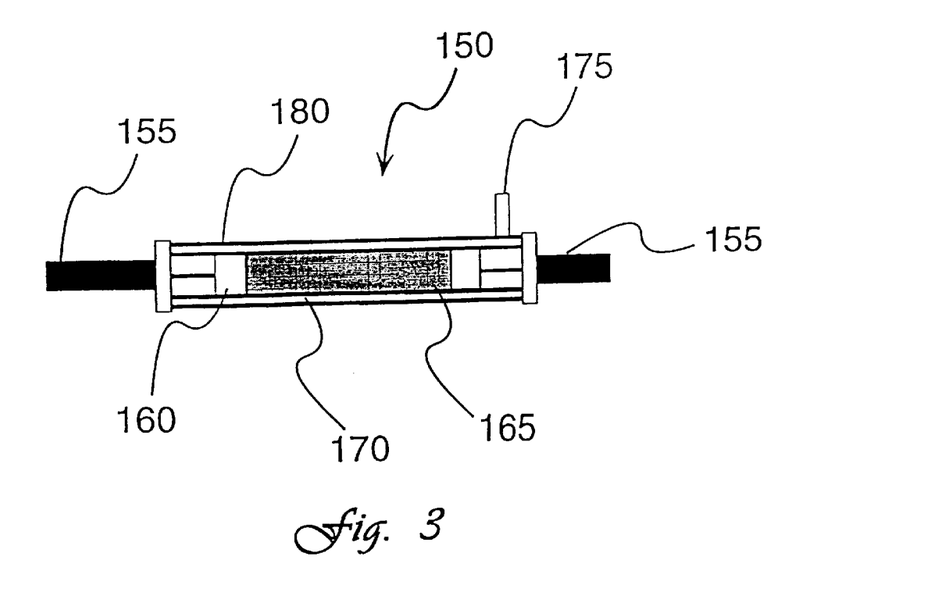
FIG. 3 is a schematic, cross-sectional view of an end fuser apparatus 150.
Figure 4:
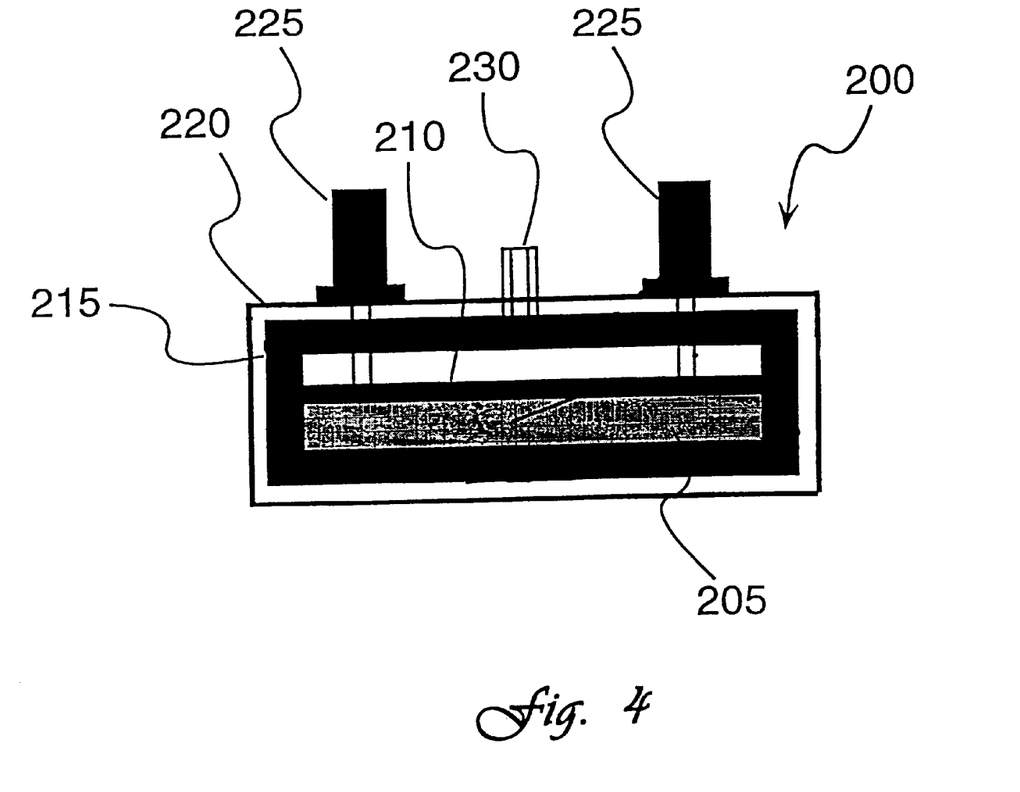
FIG. 4 is a schematic, cross-sectional view of a side fuser apparatus 200.

In a typical process for making a fused polymeric optical fiber bundle 25, cladded fibers are assembled into a bundle, fused, drawn or pulled, refused, and optionally drawn and refused through sufficient iterations to obtain the desired fiber diameter. The fiber diameter is selected to achieve a specific optical resolution. In practicing the present invention, it is preferable that the initial ratio of the cladding to the core fiber is correct so that, for example, in the formation of a microfiber, there is at least a 2 $\mu$m thick cladding surrounding a 5 $\mu$m diameter optical fiber in order to prevent leakage of light from the optical fiber. A range of diameters of cladded optical fibers from 5 $\mu$m to 20 $\mu$m may be made using the method of the present invention. In one embodiment, an imaging bundle 15 is assembled containing the chosen number of cladded optical fibers of desired size, and this bundle is drawn and fused again until the selected fiber size for a specific resolution is obtained. Tapered optical fiber bundles 25 may be made by drawing the bundles and then stopping the drawing process at a point before the bundle is wound onto the wheel. Tapered optical fiber bundles 25 may also be made by applying a heating band to the preform, drawing the fibers to a large end diameter, cutting the drawn fibers to a chosen length, and drawing the small end out. Such methods of creating tapered bundles are known to one of ordinary skill in the art of creating glass fiber tapers. After the cladded optical fibers of desired diameter and length are bundled together, they are placed in a fuser 150, 200 under vacuum, pressure, and temperature, to fuse the cladded fibers into an optical fiber bundle 25.

The steps in the fusing process are typically as follows. First, fibers or resin is loaded into a fuser 150, 200. Examples of fusers 150, 200 are shown in FIGS. 3 and 4. The fuser is evacuated to a vacuum of between about 20 and 29 inches of mercury, preferably 28 inches of mercury, and heated at a temperature of between about 20° C. and 80° C., preferably 70° C. for a period of from about 2 to 48 hours, typically 24 hours, preferably at least 12 hours. Next the temperature is raised to a temperature between about 130° C. and 200° C. over a period of 1 to 12 hours. A preferred temperature is 160° C. for a period of approximately 3 hours. Pressure is applied at a level between about 10 and 1,000 psi, resulting in a force of 50 to 500 pounds. Once 160° C. is attained this pressure and temperature are maintained for a period between approximately 0.5 to 8 hours, preferably 1 hour. The system is permitted to cool slowly, at a rate between about 5° C. and 50° C. per hour, preferably 20° C. per hour while maintaining pressure and vacuum as before. The pressure, vacuum and heat are turned off after the system temperature drops below a temperature between approximately 20° C. and 80° C., preferably below 50° C. and the preform, boule, or micro fiber boule are removed.

When an illumination fiber 20 is attached to the fused bundle 25 of optical fibers, and then housed within a sheath 30 made from stainless steel, plastic or another material, the cross-sectional diameters of the resulting imaging bundles 15 may be as small as 200 $\mu$m. Imaging bundles 15 of larger diameter may be made to any desired size. Typical materials used for cladding include acrylic which is polymethylmethacrylate (PMMA), and other materials shown in Table 2. Optical fibers may be made from many different materials such as glass, monomers or polymers. In a preferred embodiment optical fibers are made from styrene copolymer or pure styrene. Polymeric optical microfibers may have diameters as low as 3 $\mu$m. Graded index optical fibers are also preferred fibers for use in imaging bundles and may be made from a variety of monomers including, but not limited to, the monomers listed in Table 1. The refractive index is indicated as $n_D$.

TABLE 1

| Monomer | $n_D$ of polymer |
|---|---|
| methyl methacrylate | 1.49 |
| ethyl methacrylate | 1.483 |
| n-propyl methacrylate | 1.484 |
| n-butyl methacrylate | 1.483 |
| n-hexyl methacrylate | 1.481 |
| isopropyl methac#ate | 1.473 |
| isobutyl methacrylate | 1.477 |
| tert-butyl methacrylate | 1.463 |
| cyclohexyl methacrylate | 1.507 |
| benzyl methacrylate | 1.568 |
| phenyl methacrylate | 1.57 |
| 1-phenylethyl methacrylate | 1.549 |
| 2-phenylethyl methacrylate | 1.559 |
| furfuryl methacrylate | 1.538 |
| methyl acrylate | 1.4725 |
| ethyl acrylate | 1.4685 |
| n-butyl acrylate | 1.4634 |
| benzyl acrylate | 1.5584 |
| 2-chloroethyl acrylate | 1.52 |
| vinyl acetate | 1.47 |
| vinyl benzoate | 1.578 |
| vinyl phenylacetate | 1.567 |
| vinyl chloroacetate | 1.512 |
| acrylonitrile | 1.52 |
| α-methylacrylonitrile | 1.52 |
| methyl-α-chloroacrylate | 1.5172 |
| atropic acid, methyl ester | 1.560 |
| o-chlorostyrene | 1.6098 |
| p-fluorostyrene | 1.566 |
| o,p-difluorostyrene | 1.475 |
| pentabromophenylacrylate | 1.7 |
| pentachlorophenyl methacrylate | 1.63 |
| pentabromophenylmethacrylate | 1.71 |
| chlorophenylacrylate | 1.5 |
| benzylmethacrylate | 1.56 |
| 2,4,6 tribromophenylacrylate | 1.6 |
| α,ω,dichloropropyl-dimethylsiloxane | 1.42 |
| p-isopropyl styrene | 1.554 |
| 2,2,2-trifluoroethylacrylate | 1.37 |
| 2,2,2-trifluoroethylmethacrylate | 1.39 |
| tribromoneopentylmethacrylate | 1.6 |

The following monomers are among those monomers that are useful as cladding for the polymer fiber optical cable of the present invention.

TABLE 2

| 1H,1H pentadecafluorooctylacrylate | 1.33 |
|---|---|
| 1H,1H pentadecafluorooctylmethacrylate | 1.35 |
| 1H,1H,4H hexafluorobutylmethacrylate | 1.39 |
| 1H,1H,4H hexafluorobutylacrylate | 1.39 |
| 1H,1H,2H,2H heptadecafluorodecylacrylate | 1.35 |
| 1H,1H,2H,2H heptadecafluorodecylmethacrylate | 1.35 |
| hexafluoro-iso-propylacrylate | 1.40 |
| hexafluoro-iso-propylmethacrylate | 1.40 |
| 1H,1H heptafluorobutylmethacrylate | 1.37 |

TABLE 2-continued

| | |
|---|---|
| 1H,1H octafluoropentamethacrylate | 1.39 |
| 1H,1H heptafluorobutylacrylate | 1.39 |

Prepolymer compositions which are useful in the practice of the present invention, include such polymers as polycarbonates (such as those sold by General Electric Company, Schenectady, N.Y., under the trademark LEXAN™), polyesters, polyolefins, acrylic polymers (such as those sold by Cyro Industries under the trademark ACRYLITE™) and other thermoplastic polymers. Another example of a suitable acrylic polymer is polymethyl methacrylate. Other polymers which may be used in the present invention include, but are not limited to, halide-terminated organosiloxanes such as chlorine-, bromine-, and fluorine-terminated organosiloxanes, alkoxyfunctional siloxanes with an alcoholic split (i.e., an OH side group), hydroxy terminated polymer borates, dihydric phenol with readily removable ammonia groups, and diphenol propane bischloroformate.

Ultraviolet curable materials which may be used in the practice of the invention include commercially available reagents such as the following: OPTIGARD X3-6696 optical fiber coating from Dow Corning Corp., Midland, Mich.; acrylate functional siloxanes and methacrylate functional siloxanes in the presence of a photoinitiator such as ethylbenzoin; flourochemical acrylate FX-13, a technical grade of 2-(N-ethylperfluorooctanesulfonamido) ethyl acrylate, FX-14, the corresponding methacrylate, and FX-189, a technical grade of 2-(N-butylperfluorooctanesulfonamido from 3M Corp., St. Paul, Minn.; Cablelite 3287-9-31 from DSM Desotech, Inc., Elgin, Ill.; and ELVACITE acrylic resin from ICI Acrylics, Wilmington, Del.

Imaging bundles 15 may also be constructed to the desired degree of flexibility by selecting particular monomers in the construction of the optical fibers. Methods of making polymeric optical fibers, including microfibers, cladded fibers, and cladded microfibers and the materials used in these methods are described in the following patent applications which are incorporated herein by reference in their entirety: U.S. patent application Ser. No. 08/594,711 U.S. Pat. No. 5,861,129 filed Jan. 31, 1996; U.S. patent application Ser. No. 08/667,218 U.S. Pat. No. 5,747,610 filed Jun. 21, 1996; U.S. Provisional Patent Application Ser. No. 60/042,876, filed Apr. 1, 1997; U.S. Provisional Patent Application Ser. No. 60/054,088, filed Jul. 29, 1997; and PCT application PCT/US97/16441 filed on Sep. 15, 1997. The following patent applications concerning methods of making polymeric optical fibers, graded index polymeric optical fibers, microfibers, cladded fibers, and cladded microfibers and the materials used in these methods are attached to the present application in Appendix A: PCT application PCT/US97/16441, and U.S. patent application Ser. No. 08/667,218 filed Jun. 21, 1996 U.S. Pat. No. 5,747,610.

Imaging bundles 15 may be designed in a variety of configurations. Imaging bundles 15 may also be utilized in a unitary mode, in an array, in an annular arrangement or other configuration depending on the desired application. For example, an annular arrangement of imaging bundles 15 may be useful for viewing objects passed through the center of the annulus, such as a tube riding on a sleeve or central rod. In another configuration, a unitary imaging bundle may be used in an endoscopic device. A unitary imaging bundle may refer to a single graded index optical fiber or to a combination of optical fibers wherein the fibers are bundled together like wires in a cable. An array of imaging bundles 15 may be used for analysis of a complex surface of significant cross-sectional area, such as an artificial lens for implantation into the eye, a computer chip or integrated circuit, or a microsurgical scalpel blade.

A lens or several lenses may be incorporated into the imaging bundle 15 and placed on one or both ends of the fused polymeric optical fiber bundle 25. A graded index microlens (Melles Griot, Irvine, Calif., Edmund Scientific Co., Barrington, N.J., NSG America Inc., Sumerset, N.J., or OptoSigma, Santa Ana, Calif.) which has excellent optical data transmission properties may be used. This lens has a radial index gradient which causes light to be focused within the lens. Light and/or an image may be focused on the remote face of the lens and then transmitted into the polymeric optical fibers within the optical fiber bundle 25. In another embodiment, several lenses, including graded index microlenses may be used with the imaging bundle. Different lenses may be selected for wavelength specificity.

It is also within the scope of the present invention to insert a lens or combination of lenses on one or both ends of the optical fiber bundle 25. Lenses of different numerical apertures known to one of ordinary skill in the art may be selected to provide various degrees of magnification and light collecting capability. In one embodiment, high numerical aperture lenses may be used on one end of an optical fiber bundle 25 housed in an imaging bundle 15 within an endoscopic device to provide high magnification and resolution of the object to be viewed, for example, a polyp, a diverticulum, an area of inflammation or bleeding, a tumor, an obstruction, an aneurysm, or an atherosclerotic plaque.

Lenses for use in the imaging bundle 15 may also be made from ultraviolet-curable silicon or fluorinated gels. Gels which may be fluorinated include, but are not limited to polymethylmethacrylate (PMMA) and other polymers. Ultraviolet curable materials which may be used in the practice of the invention include commercially available reagents such as the following: OPTIGARD X3-6696 optical fiber coating from Dow Corning Corp., Midland, Mich.; acrylate functional siloxanes and methacrylate functional siloxanes in the presence of a photoinitiator such as ethylbenzoin; flourochemical acrylate FX-13, a technical grade of 2-(N-ethylperfluorooctanesulfonamido) ethyl acrylate, FX-14, the corresponding methacrylate, and FX-189, a technical grade of 2-(N-butylperfluorooctanesulfonamido from 3M Corp., St. Paul, Minn.; Cablelite 3287-9-31 from DSM Desotech, Inc., Elgin, Ill.; and ELVACITE acrylic resin from ICI Acrylics, Wilmington, Del.

When a multiplicity of lenses is to be placed on the end of the fused bundle, ultraviolet-curable silicon is placed on the desired end of the fused bundle and then a pulsed green laser of about 532 nm (50 microsecond (ms) to 100 picosecond (ps) pulses) is passed through the other end of the fused bundle. It is to be understood that other wavelengths and pulse durations of the laser energy may be used as long as the lens is formed on the end of the selected optical fiber. The energy of the laser creates a multiplicity of very small convex lens on the end of the bundle, which are subsequently cured by ultraviolet radiation, thereby increasing the resolution of the bundle significantly. The resolution of the image is increased and the graininess of the image is decreased with the multiplicity of very small convex lens on the end of the imaging bundle. A one-to-one relationship may be achieved between each convex lens and the end of each optical fiber within the bundle. Resolution of 50 nm to 200 nm may be obtained with this configuration of the fused optical fiber bundle 25 and a lens on each polymeric optical fiber. In addition, this configuration of the fused optical fiber bundle 25 captures light more efficiently.

In addition to various lenses which may be employed in the present invention, it is also within the scope of the present invention to optionally include various filters which may be temporarily or permanently inserted on one end of the optical fiber bundle 25. The filters and lens may be attached to the optical fiber bundle 25 with any suitable means. UV-curable epoxy has been used to achieve such attachments. These filters may provide various capabilities to pass certain wavelengths or block certain wavelengths in order to provide viewing of selected wavelengths. For example, filters or combinations of filters may be employed to optimize viewing of fluorochromes including but not limited to, fluorescein, rhodamine, Texas red, ethidium bromide, and acridine. Filters may also be inserted on one end of the optical fiber bundle 25 which shift the wavelength of light.

Objects to be viewed with the imaging bundles 15 of the present invention may be positioned in different ways relative to the imaging bundles 15. Alternatively, the imaging bundles 15 may be moved relative to the objects. It is within the scope of the present invention to use tapered optical fiber bundles to permit three-dimensional viewing of objects. It is further within the scope of the present invention to provide movement in x, y, and z coordinates of either or both the imaging bundles or the objects to be viewed. Translation tables or stages 60 may be used to move the imaging bundle relative to the object to be viewed. Translation stages 60 may also be used to move the object to be viewed relative to the imaging bundle.

In another embodiment of the present invention, optical data are transmitted through the imaging bundles 15 linked to CCDs 45, processors 40, and imaging boards within computers 35 for compilation, integration, manipulation and viewing. In this manner, for example, a manufacturing defect in a stent 50 may be located within the stent 50, the characteristics of the defect measured and analyzed, and that production batch of stents or a particular stent identified. This information would rapidly permit modification of production parameters and provide a record of physical characteristics at the time of manufacture.

Lenses may be used in combination with the imaging bundles to magnify the image transmitted through the optical fiber bundle which is then presented to the CCD 45. A CCD 45 with an attached lens facing the imaging bundle is considered as a camera in the context of the present invention. Although a lens is not required on the CCD 45 for receipt of visual information from the optical fiber bundle, a lens is usually employed. It is to be understood that various lenses may be used in the CCD 45, and also in the focusing of the image from the optical fiber bundle to the CCD as may suggest themselves to one of ordinary skill in the art. The use of optical fiber bundles, especially tapered optical fiber bundles, optionally in combination with lenses on the bundle and optionally in combination with a CCD containing a lens, permits magnification of the image while retaining excellent resolution. The spatial configuration of the CCD in relationship to the optical fiber bundle may be accomplished through different means as known to one of ordinary skill in the art, and will be determined based on the requirement for a focused image.

Processors 40 useful in the practice of the present invention provide the capability to optionally preprocess optical information, manipulate the optical information, and to increase the speed of processing optical information. Such processors 40 may function in a parallel processing mode and manipulate information obtained from simultaneous viewing of different objects before the information is introduced into the computer. Processors 40 may be a component of the computers 35 used in the practice of the present invention. Alternatively, processors 40 may be independent units and may include computer components known to one of ordinary skill in the art. Processors 40 may include imaging boards as described in the present application and as known to one of ordinary skill in the art.

Computers 35 useful in the practice of the present invention include commercially available personal computers. A preferred computer is a computer with the following characteristics: a line speed of 166 MHz or greater, a minimum of 16 MB of RAM, a minimum of 1 GB of hard disk memory. A more preferred computer has a speed of 166 MHz, a Pentium chip with MMX capability, 32 MB of RAM, and 1 GB of hard disk memory.

The computer 35 used in the present invention optionally contains an imaging board with a connector, optionally a BNC connector. As stated above, the imaging boards may also be part of the processors 40. The connector on the imaging board is connected with a cable to the CCD for receipt of optical information. Imaging boards are available from National Instruments, Austin Tex., Data Translation, Inc., Marlboro, Mass., Matrox Electronics, Inc., Edison, N.J., and EPIX, Inc., Buffalo Grove, Ill.

The computer 35 contains system-specific imaging software to create a three-dimensional data matrix, and for processing the optical information into an image which may be manipulated and stored in computer memory. The imaging software is available from commercial vendors such as IDL, Inc., Boulder, Colo., Data Translation, Inc., Marlboro, Mass., and Matrox Electronics, Inc., Edison, N.J. A preferred imaging software is Lab View software which contains translation software for moving and manipulating images. Another preferred imaging software is Global Lab Image software from National Instruments, Austin Tex., which has translation software included. It is to be understood that other types of imaging software and translation software may be chosen by one of ordinary skill in the art of manipulating optical information.

The display means connected to the computer may be any suitable means for viewing the image with acceptable resolution. A preferred monitor is a 17 inch Sony Multiscan SF2 monitor. Other monitors with higher resolution will provide a superior image and may be used in the present invention.

In addition to use of the present invention for analysis of stents 50, integrated circuits, chips or numerous other products, the present invention may be used to obtain images of objects or surfaces that are difficult to access. Mechanics can use the imaging bundles of the present invention to view the interior of engine components, for example pistons within diesel engines, or components of jet engines in order to ascertain possible defects or causes of engine malfunction, or to perform routine maintenance more efficiently. Plumbers can employ the imaging bundles of the present invention to examine pipes, especially sewer pipes, water pipes, drain pipes and also gaskets and couplings in order to determine the source of a leak or blockage. Air conditioning ducts, heating ducts and air supplies can also be examined using the imaging bundles of the present invention. The imaging bundles of the present invention can be employed by electricians to inspect wires and connections, including wires within conduits that are difficult to access.

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims. Unless otherwise indicated, all chemicals are obtained from Aldrich Chemical Company, Milwaukee, Wis.

EXAMPLE 1

Automated System for Evaluating Stents

Figure 1:
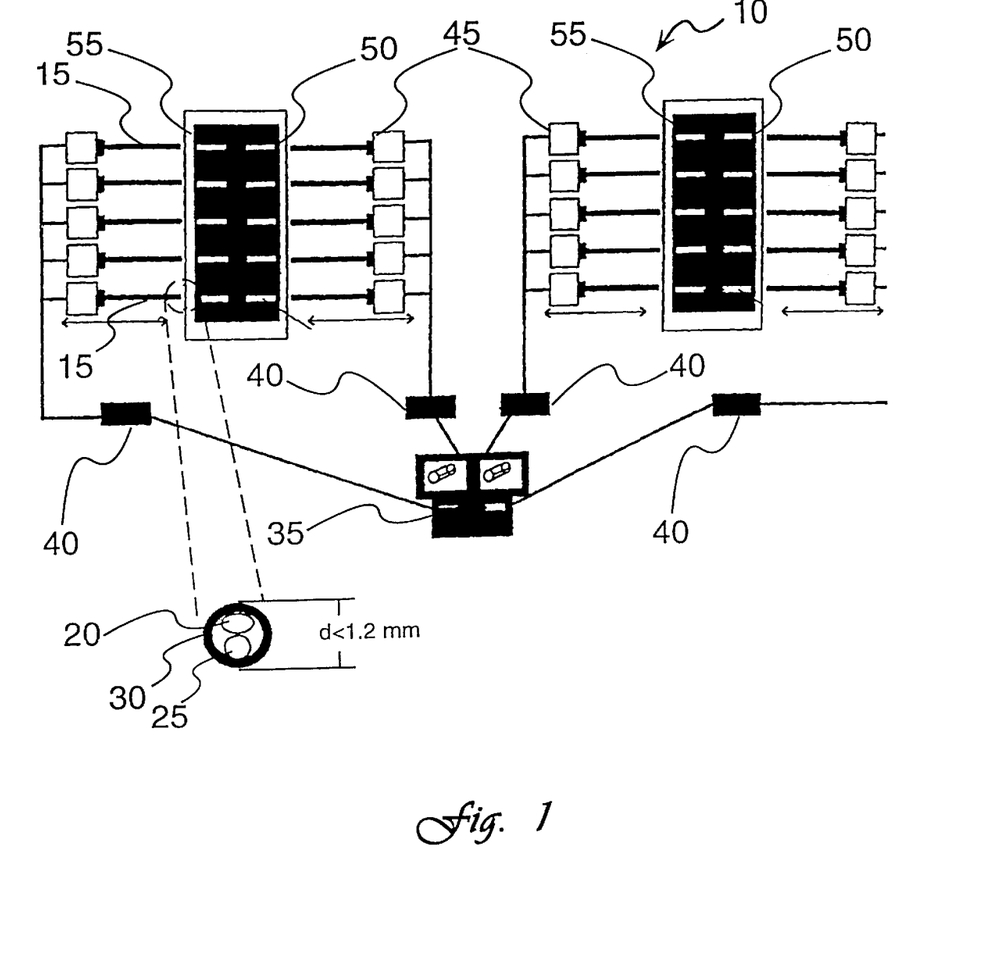
FIG. 1 is a schematic top view of a three-dimensional imaging system 10 for stents 50 showing concurrent analysis of two trays 55 of stents 50.
Figure 2:
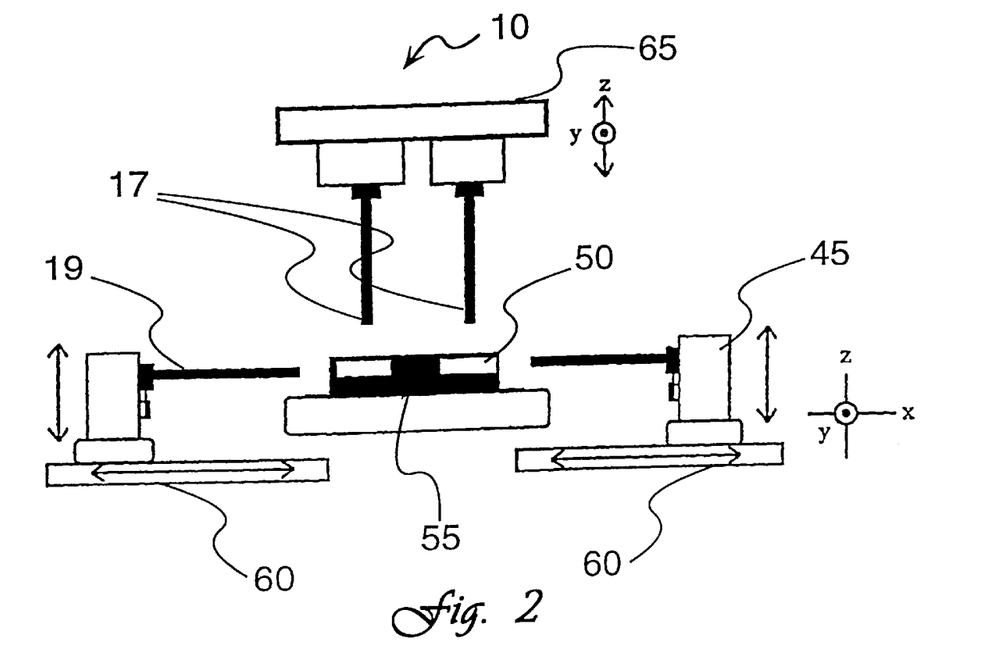
FIG. 2 is a schematic end view of one of the three-dimensional imaging systems 10 for stents 50 shown in FIG. 1. Translation stages 60 and 65 move the imaging bundles 19 and 17, respectively in x, y, and z coordinates relative to the stents 50 held in a stent tray 55.

In one embodiment, ten imaging microfiber bundles are coupled to CCDs 45 which are linked to processors 40 linked to a computer 35 containing a BNC connector. The imaging bundles contain cladded polymeric optical fibers of desired number, size and resolution, which are fused together in an optical fiber bundle 25, and housed with an illumination fiber 20 within a stainless steel sheath 30 (FIGS. 1 and 2). The cross-sectional diameter of the imaging bundle 15 is about 1.2 mm although other sizes may be constructed. The resolution of this imaging bundle 15 is about 200 $\mu$m. These bundles are tapered, which allow the three-dimensional imaging of the objects examined. The individual cladded microfiber diameter may be from 4 $\mu$m to 100 $\mu$m although the diameter of the fibers in this example was 10 $\mu$m.

The CCD 45 is a widely used device for the electronic recording of optical images. The CCDs 45 used in the present invention may be purchased from vendors such as Burle, GBC, Eastman Kodak, Co., Rochester, N.Y., Phillips Photonics, Slatersville, R.I., Princeton Instruments, inc., Trenton, N.J., Loral Fairchild, Inc., Milpitas, Calif., Photonic Detectors, Inc., Simi Valley, Calif., and Photometrics, Inc., Tucson, Ariz. In a preferred embodiment, a high resolution CCD from Burle is used.

The imaging bundles 15 are linked to CCDs 45 which are mounted on a translation stage 60 that permits movement in x, y, and z planes (FIGS. 1 and 2). The translation stages are available commercially from vendors such as Aerotech, Inc., Pittsburgh, Pa., Control Optics, Inc., Baldwin Park, Calif., DelTron Precision, Inc., Bethel, Conn., Ealing Electro-Optics, Inc., Holliston, Mass., Melles Griot, Irvine, Calif., and Newport Corp., Irvine, Calif.

The processor contains system-specific software used to create a three-dimensional data matrix for each stent 50. Imaging software is available from vendors such as National Instruments, Austin Tex., IDL, Inc., Boulder, Colo., Data Translation, Inc., Marlboro, Mass., and Matrox Electronics, Inc., Edison, N.J. In a preferred embodiment, Global Lab Image software or Lab View software (National Instruments, Austin Tex.; Data Translation Inc., Marlboro, Mass.) are used.

The imaging boards are available from National Instruments, Austin Tex., Data Translation, Inc., Marlboro, Mass., Matrox Electronics, Inc., Edison, N.J., and EPIX, Inc., Buffalo Grove, Ill. The imaging boards have a BNC connector for connection via a cable to the CCD 45. This data matrix is an ordered collection of each surface data element or pixel for each stent 50.

These data may be stored in a computer 35 for interrogation, manipulation, transformation, analysis, or display. The imaging software is available from commercial vendors such as National Instruments, Austin Tex., IDL, Inc., Boulder, Colo., Data Translation, Inc., Marlboro, Mass., and Matrox Electronics, Inc., Edison, N.J. In a preferred embodiment, Global Lab Image software or Lab View software (National Instruments, Austin Tex.; Data Translation Inc., Marlboro, Mass.) are used.

The computer 35 compares the data from each stent 50 to the standard, and if the resulting differential falls outside acceptable limits, the computer 35 sends a reject message to a display means and stores the result of the analysis in memory assigned to that specific stent 50 for identification. Commercially available software, known to one of ordinary skill in the art, may be used for making these comparisons between the optical data from the stent viewed and the acceptable standard. Storage of optical data from each stent 50 and the analysis of these data provide a record of the physical characteristics of the stent 50 at the time of manufacture.

In another embodiment, these data may also be introduced into a computer-based, trained neural network for analysis by the network. The neural network recommends acceptance or rejection of the stent and provides an analysis of the probable cause of the defect in a stent 50 or a batch of stents, thereby providing useful information to the manufacturing personnel and to machines for reevaluation of machine function, recommended calibration and maintenance, and or operating specifications.

The imaging bundles 15 are small enough to be inserted individually into each of the ten stents to be examined at any one time. These interior imaging bundles 19 are also used to raise and rotate the stents so that the exterior surface of each stent 50 may be fully illuminated and imaged from the imaging bundles 17 located above the stent tray 55 (FIG. 2). These imaging bundles 17 located above the stent tray 55 may be moved in y and z dimensions by a translation stage 65, however it is considered within the scope of the invention to move these imaging bundles in x, y, and z dimensions. The stents 50 are held in a slotted stent tray 55, each stent having a specific address or code for identification and labeling of the generated data set for that specific stent 50. The imaging bundles 15 may also be moved by translation stages 60, 65 in the x, y, and z planes outside the stent 50 so that the entire exterior surface may be viewed (FIG. 2). In this example, imaging bundles 17 are also located above the stents 50 for a top down view of the stent 50. This system has the capability of producing three-dimensional images while maintaining a one-to-one characterization with each pixel. It is important to indicate that the three-dimensional image is not obtained from software manipulation of the data, but rather is collected from the fiber bundle due to its characteristic configurations, such as size, the length of the tapered bundle, and the diameter sizes of the ends of the tapered bundle. The information obtained from examining the ten stents 50 is stored in a computer 35 for subsequent analysis, including comparison of the collected data to data representing the minimal acceptable quality control parameters for useful and safe stents. This computer analysis of the comparison of the examined stent and the standard for manufactured stents provides the data used to make a recommendation to accept the stent 50 as meeting the manufacturing standard, or to reject the stent 50 as failing to meet the manufacturing standard.

This system provides high spatial resolution (to about 1 $\mu$m in this example), as well as an economical, faster and more accurate analysis of stents than presently available. This system decreases manufacturer liability by providing automatic fail-safe criteria for rejection of stents that fall below the standard for acceptance. This system also provides the capability to maintain a manufacturing record in the form of a quantitative data base for each stent or each batch of stents at the time of manufacture. Finally, this approach eliminates the variability and loss of time introduced by human examination of the stents.

EXAMPLE 2

System for Viewing Stents

In one embodiment of the present invention, a system was constructed for viewing stents. Polymeric optical fibers, comprised of a core of polystyrene and a cladding of polymethylmethacrylate, with an initial diameter of between approximately 0.75 mm and 1 mm were bundled into a preform rod of about 2.5 inches in diameter. The preform rod was drawn down to make tapered bundles of polymeric optical fibers of diameters ranging from about 0.5 mm to 2 mm.

A graded index lens (such as known in the art but including those provided by Melles Griot, Irvine, Calif.) was placed on the first end of the bundle pointed at the stent. A second graded index lens (Melles Griot, Irvine, Calif.), approximately 6 mm in diameter, was placed on the second end of the bundle between the bundle and the charge coupled device. The bundle, second lens, and charge coupled device were configured so that the camera lens of the charge coupled device was focused on the face of the second lens located on the second end of the bundle. In this configuration, the camera lens of the charge coupled device was separated from the surface of the second lens located on the second end of the bundle by a space. A cable transmitted the optical information from the charge coupled device to a BNC connector on the imaging board (National Instruments, Austin Tex.) housed in a computer. The computer used was a personal computer with a 166 MHz Pentium chip with MMX capability, 32 MB of RAM and 1 GB of hard disk memory. The computer was loaded with IMAQ software (National Instruments). A 17 inch Sony Multiscan SF2 monitor was connected to the computer for viewing the visual information from each stent.

The imaging bundle was mounted on a translation stage and slowly inserted into the stent for viewing the interior surface of the stent. Illumination was provided through an external source and no illumination fiber was attached to the imaging bundle in this Example.

Stainless steel stents were examined with this system which provided a resolution (pixel size) of between approximately 18 $\mu$m and 20 $\mu$m. Burrs, chips and defects in the interior and exterior surfaces of the stents were easily identified. In this manner, stents with manufacturing defects were identified with high resolution.

EXAMPLE 3

Fusing Optical Fiber Bundles Using End On Fusing

In one embodiment of the present invention, fibers are fused into bundles by using a method called end on fusing with an end fuser apparatus 150. A stainless steel pipe 170 is highly polished on its interior surface. This pipe 170 has two plugs on either side. The fiber bundle or material to be fused 165 is placed within the stainless steel pipe 170 and then the pipe is heated with a heater band 180 to about approximately 70° C. for 12 to 24 hours under a vacuum of about 28 inches of mercury. Sufficient vacuum is applied through a port 175 to remove the air, degas the plastic, and prevent bubble formation within the fused fiber bundle. The amount of heat which is applied is sufficient to soften the plastic and therefore depends on the specific plastic employed to make the fibers. The heat softens the fiber bundle and these conditions fuse the bundle. Heat may be applied to the pipe through any convenient means such as a heat wrap or heater band 180 around the pipe 170.

Next the temperature is raised to about 160° C. over approximately a 3 hour period. Once a temperature of about 160° C. is attained, pressure of between about 10 and 1,000 psi is applied through air pistons 155 to a compression piston 160 and maintained for about 1 hour. The bundle is then cooled slowly, at approximately 20° C. per hour, and after the system is below about 50° C., the heat, pressure and vacuum are turned off and the fused preform, boule or micro-micro fiber boule is removed from the pipe 170. This method sometimes decreases the coherence of the fibers on the ends of the fused bundle, however the other regions of the fused bundle are highly coherent.

EXAMPLE 4

Fusing Optical Fiber Bundles Using Side Fusing

In another, more preferred embodiment, fiber bundles are fused using a side approach in a side fuser apparatus 200 (FIG. 4). In this method, fibers or other materials to be fused 205 are placed in a rectangular bed within the stainless steel housing 215 under vacuum and temperature, and air pressure is applied from the side through air pistons 225 applying pressure to a fusing plate 210, as opposed to application from the end, thereby eliminating the damage to the ends of the fused bundle. The temperature, pressure, vacuum and durations are similar to Example 3. Vacuum is applied through a vacuum port 230 and heating bands or heating strips 220 are employed to increase temperature.

EXAMPLE 5

Formation of Lenses for Fibers

Lenses for use in the imaging bundle may also be made from ultraviolet-curable materials including silicon or fluorinated gels. Ultraviolet curable materials which may be used in the practice of the invention include commercially available reagents such as the following: OPTIGARD X3-6696 optical fiber coating from Dow Corning Corp., Midland, Mich.; acrylate functional siloxanes and methacrylate functional siloxanes in the presence of a photoinitiator such as ethylbenzoin; flourochemical acrylate FX-13, a technical grade of 2-(N-ethylperfluorooctanesulfonamido) ethyl acrylate, FX-14, the corresponding methacrylate, and FX-189, a technical grade of 2-(N-butylperfluorooctanesulfonamido from 3M Corp., St. Paul, Minn.; Cablelite 3287-9-31 from DSM Desotech, Inc., Elgin, Ill.; and ELVACITE acrylic resin from ICI Acrylics, Wilmington, Del.

When a multiplicity of lenses is to be placed on the end of the fused bundle, ultraviolet-curable silicon is placed on the desired end of the fused bundle and then a pulsed green laser (532 nm applied in 5 nanosecond pulses) is passed through the other end of the fused bundle. The energy of the laser creates a multiplicity of very small convex lens on the end of the bundle, which are subsequently cured by ultraviolet radiation, thereby increasing the resolution of the bundle significantly. A one-to-one relationship may be achieved between each convex lens and the end of each optical fiber. Resolution of about 50 nm to 200 nm may be obtained with this configuration of the fused bundle and a lens on each polymeric optical fiber.

It should be understood, of course, that the foregoing relates only to preferred embodiments of the present invention and that numerous modifications or alterations may be made therein without departing from the spirit and the scope of the invention.

I claim:

1. An apparatus for viewing an object, comprising:
   an optical fiber bundle comprised of glass or polymeric optical fibers, the optical fiber bundle having a first end for pointing toward an object and a second end; and
   a charge coupled device configured in relationship to the second end of the optical fiber bundle.

2. The apparatus of claim 1, wherein the polymeric optical fibers are comprised of a core of optical fibers made from a monomer or monomers, and a cladding.

3. The apparatus of claim 2, wherein the monomer is styrene, polystyrene or copolymers of styrene, and the cladding is polymethylmethacrylate.

4. The apparatus of claim 1, wherein the optical fiber bundle is comprised of tapered polymeric optical fibers.

5. The apparatus of claim 1, wherein the optical fiber bundle is comprised of fibers which are fused or bundled together.

6. The apparatus of claim 1, further comprising a lens on the first end or second end of the bundle.

7. The apparatus of claim 6, wherein the lens is a graded index lens.

8. The apparatus of claim 1, wherein the polymeric optical fibers are graded index optical fibers.

9. The apparatus of claim 1, wherein the optical fibers contain additives for shifting radiation wavelength.

10. An apparatus comprising one or more illumination fibers attached to the optical fiber bundle of claim 1, wherein the illumination fiber or fibers transmit radiation.

11. The apparatus of claim 10, wherein the radiation is selected from visible, ultraviolet, infrared, gamma and x-ray radiation wavelengths.

12. The apparatus claim 10, further comprising a sheath surrounding the imaging bundle.

13. The apparatus of claim 1, wherein a lens is inserted on each optical fiber on the first or second end of the optical fiber bundle.

14. The apparatus of claim 1, further comprising one or more lenses placed between the second end of the imaging bundle and the charge coupled device.

15. The apparatus of claim 1, further comprising a processor.

16. The apparatus of claim 1, further comprising an imaging board wherein the imaging board is linked to the charge coupled device with a cable.

17. The apparatus of claim 16, further comprising a computer containing software for processing optical information.

18. An apparatus for viewing a plurality of objects, the apparatus comprising:
   a plurality of optical fiber bundles, each of said plurality of optical fiber bundles comprising a plurality of tapered optical fibers, each of said plurality of optical fibers having a diameter in the range of from 4 micrometers to 100 micrometers and each of said optical fiber bundles comprising a first end for directing toward an object and extending to a second end;
   at least one lens configured in relationship to the first end or to the second end; and
   at least one charge coupled device configured in relationship to the second end.

19. An apparatus for three-dimensional viewing of objects, comprising:
   a tapered, polymeric, optical fiber bundle with a first end and a second end, wherein the optical fibers are graded index optical fibers and transmit optical information;
   a charge coupled device configured in relationship to the second end of the optical fiber bundle;
   a graded index lens placed between the second end of the optical fiber bundle and the charge coupled device;
   an imaging board, wherein the imaging board is linked to the charge coupled device with a cable; and
   a computer containing software for processing the optical information.

20. An apparatus for simultaneous viewing of more than one object, wherein the object is hollow, and the system is comprised of one or more of the apparatuses of claim 19, further comprising:
   means for mounting each optical fiber bundle on a support;
   a first translation stage for moving the support with the attached optical fiber bundle inside the object; and
   a second translation stage for moving the support with the attached optical fiber bundle around the object.

21. An apparatus as claimed in claim 20, wherein said object is a stent.

* * * * *